US011195024B1

(12) United States Patent
Fan et al.

(10) Patent No.: US 11,195,024 B1
(45) Date of Patent: Dec. 7, 2021

(54) CONTEXT-AWARE ACTION RECOGNITION BY DUAL ATTENTION NETWORKS

(71) Applicants: INTERNATIONAL BUSINESS MACHINES CORPORATION, Armonk, NY (US); MASSACHUSETTS INSTITUTE OF TECHNOLOGY, Cambridge, MA (US)

(72) Inventors: Quanfu Fan, Lexington, MA (US); Dan Gutfreund, Newton, MA (US); Tete Xiao, Arlington, MA (US); Bolei Zhou, Hong Kong (CN)

(73) Assignees: INTERNATIONAL BUSINESS MACHINES CORPORATION, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 16/925,469

(22) Filed: Jul. 10, 2020

(51) Int. Cl.
*G06K 9/00* (2006.01)
*G06F 3/01* (2006.01)
*G06N 3/08* (2006.01)

(52) U.S. Cl.
CPC ......... *G06K 9/00744* (2013.01); *G06F 3/013* (2013.01); *G06K 9/00718* (2013.01); *G06N 3/08* (2013.01)

(58) Field of Classification Search
None
See application file for complete search history.

(56) References Cited

U.S. PATENT DOCUMENTS 6,735,253 B1 * 5/2004 Chang .................... G11B 27/28 375/240.16
8,391,630 B2 * 3/2013 Mathew ............... G09G 3/3466 382/264

(Continued)

OTHER PUBLICATIONS

Byeon et al., "ContextVP: Fully Context-aware Video Prediction," Proc. Computer Vision Conf. ECCV 2018, pp. 781-797, Jun. 10, 2018. (Year: 2018).*

(Continued)

*Primary Examiner* — Reza Aghevli
(74) *Attorney, Agent, or Firm* — Cantor Colburn LLP; Stosch Sabo

(57) ABSTRACT

Provided are embodiments including a computer-implemented method for performing recognition. The computer-implemented method includes receiving video data, and performing, at a pre-attention prediction module, a pre-attention prediction for the video data to generate first prediction priors. The computer-implemented method also includes receiving, at a dual attention module, data including the video data and data from the pre-attention prediction to generate attention maps, wherein the attention maps indicate a region of interest of a frame of the video data, wherein the dual attention module generates enhanced feature representations, and performing, at a post-attention prediction module, a post-attention prediction from data from the dual attention module based at least in part on the enhanced feature representation. Also provided are embodiments for a system and a computer program produce for performing recognition.

15 Claims, 4 Drawing Sheets

120 Operating System
104
103 Hard disk
Tape Unit 105
101c CPU
101b CPU
101a CPU
ROM 102
RAM 114
I/O Adapter 107
Communications Adapter 106
Network 116
System Bus 113
108 User Interface Adapter
112 Display Adapter
Graphics Processing Unit 130
Keyboard 109
Mouse 110
Speaker 111
115 Display
100 Processing System

(56) References Cited

U.S. PATENT DOCUMENTS

| | | | |
|---|---|---|---|
| 8,447,863 B1 | 5/2013 | Francis, Jr. et al. | |
| 8,639,644 B1 | 1/2014 | Hickman et al. | |
| 9,616,568 B1 | 4/2017 | Russell | |
| 9,838,743 B2 * | 12/2017 | Swaminathan | H04N 21/4532 |
| 10,131,051 B1 * | 11/2018 | Goyal | B25J 9/1697 |
| 10,382,769 B2 * | 8/2019 | Schneider | H04N 19/593 |
| 10,521,705 B2 * | 12/2019 | Lu | G06K 9/6256 |
| 2007/0147688 A1 * | 6/2007 | Mathew | G09G 3/3466 382/232 |
| 2013/0215115 A1 * | 8/2013 | Jenkins | G06F 16/56 345/420 |
| 2017/0237996 A1 * | 8/2017 | Schneider | H04N 19/593 382/168 |
| 2017/0251258 A1 * | 8/2017 | Swaminathan | H04N 21/6125 |
| 2018/0046857 A1 * | 2/2018 | Gao | G06K 9/00771 |
| 2018/0374210 A1 * | 12/2018 | Barker | G06T 7/90 |
| 2019/0045317 A1 * | 2/2019 | Badhwar | H04S 1/005 |
| 2019/0147305 A1 * | 5/2019 | Lu | G06F 16/583 382/157 |
| 2020/0334894 A1 * | 10/2020 | Long | G06T 15/205 |
| 2020/0363801 A1 * | 11/2020 | He | G05D 1/0212 |
| 2020/0363813 A1 * | 11/2020 | He | G06N 3/006 |
| 2020/0363814 A1 * | 11/2020 | He | G05D 1/0217 |
| 2021/0089867 A1 * | 3/2021 | Byeon | G06N 3/0445 |
| 2021/0145608 A1 * | 5/2021 | Herr | A61B 5/004 |

OTHER PUBLICATIONS

Sun, "Ojbect Categorization for Affordance Prediction", Thesis, Degree Doctor of Philosophy, College of Computing, Georgia Institute of Technology Aug. 2008, 151 pages.

Koppula et al., "Learning Human Activities and Object Affordances from RGB-D Videos", arXiv:1210.1207v2 [cs.RO] May 6, 2013, https://arxiv.org/abs/1210.1207, (Submitted on Oct. 4, 2012 (v1), last revised May 6, 2013 (this version, v2)), accessed Apr. 21, 2019, 18 pages.

Lee et al., "A Syntactic Approach to Robot Imitation Learning using Probabilistic Activity Grammars", Robotics and Autonomous Systems, vol. 61, No. 12, Dec. 2013, pp. 1323-1334.

Singh et al., "BigBIRD: A large-scale 3D Database of Object Instances". (Conference Paper). Conference: 2014 IEEE International Conference on Robotics and Automation (ICRA), May 2014, pp. 509-516.

Xiao et al., "Reasoning About Human-Object Interactions Through Dual Attention Networks", University of California, MIT-IBM Watson AI Lab, The Chinese University of Hong Kong, Sep. 10, 2019, 10 pages.

* cited by examiner 300
306
310
Attended features
308
softmax
304
302
MLP
h
p
Action/object priors
Image features

CONTEXT-AWARE ACTION RECOGNITION BY DUAL ATTENTION NETWORKS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Reasoning About Human-Object Interactions Through Dual-Attention Networks; Tete Xiao, Quanfu Fan, Dan Gutfreund, Mathew Monfort, Aude Oliva, Bolei Zhou; University of California, Berkeley, MIT-IBM Watson AI Lab, IBM Research, Massachusetts Institute of Technology, and The Chinese University of Hong Kong; Sep. 10, 2019.

BACKGROUND

The present invention generally relates to programmable computers, and more specifically to programming computers configured and arranged to execute image processing using context-aware action recognition by dual attention networks.

An image is a digital representation or facsimile of a physical object or a collection of physical objects. Technology presently exists to detect or recognize certain objects that are present in a given image. For example, a digital camera can recognize that objects, such as human faces or human eyes, are present in an image created by the camera lens on the sensor of the camera. Photo editing software can recognize that objects, such as straight lines, are present in an image being edited.

SUMMARY

Embodiments of the present invention are directed to a computer-implemented method for context-aware action recognition by dual attention networks. A non-limiting example of the computer-implemented method includes receiving video data, and performing, at a pre-attention prediction module, a pre-attention prediction for the video data to generate first prediction priors. The computer-implemented method also includes receiving, at a dual attention module, data including the video data and data from the pre-attention prediction to generate attention maps, wherein the attention maps indicate a region of interest of a frame of the video data, wherein the dual attention module generates enhanced feature representations, and performing, at a post-attention prediction module, a post-attention prediction from data from the dual attention module based at least in part on the enhanced feature representation.

Embodiments of the present invention are directed to a system for context-aware action recognition by dual attention networks. A non-limiting example of the system includes a neural network configured to receive video data, and a pre-attention prediction module configured to generate a pre-attention prediction from the video data. The system also includes a dual attention module configured to generate an attention map using the first prediction, wherein the attention maps indicates a region of interest of a frame of the video data, wherein the dual attention module generates enhanced feature representations, and a second prediction module configured to generate a post-attention prediction based at least in part on the attention map and the enhanced feature representations.

Embodiments of the invention are directed to a computer program product for context-aware action recognition by dual attention networks, the computer program product comprising a computer readable storage medium having program instructions embodied therewith. The program instructions are executable by a processor to cause the processor to perform a method. A non-limiting example of the method includes receiving video data, and performing, at a pre-attention prediction module, a pre-attention prediction for the video data to generate first prediction priors. The method also includes receiving, at a dual attention module, data including the video data and data from the pre-attention prediction to generate attention maps, wherein the attention maps indicate a region of interest of a frame of the video data, wherein the dual attention module generates enhanced feature representations, and performing, at a post-attention prediction module, a post-attention prediction from data from the dual attention module based at least in part on the enhanced feature representation.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
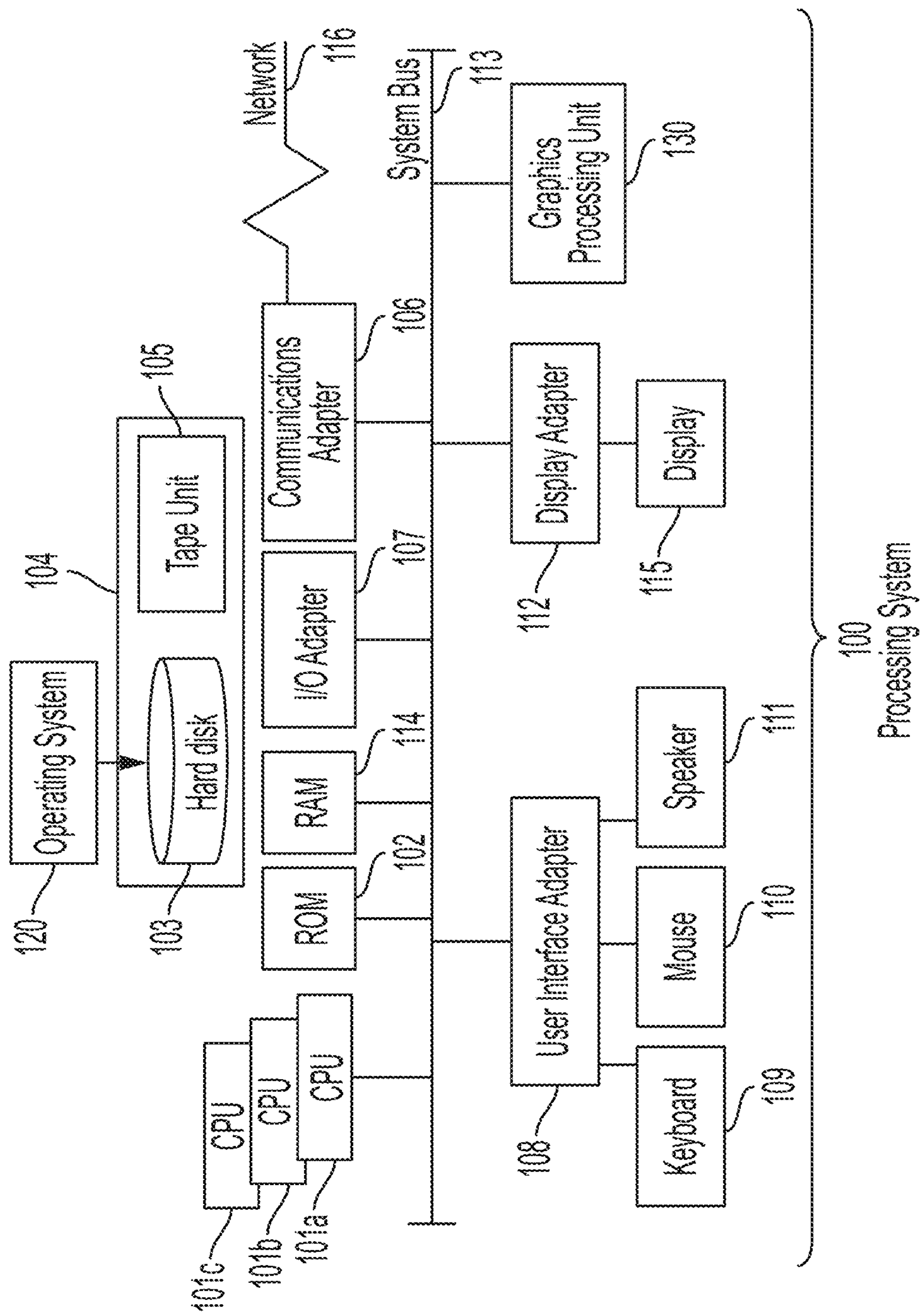
FIG. 1 depicts a processing system for implementing embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, various prediction models are used for object recognition and action recognition in images and video. In an example, deep convolutional neural networks can be used to perform the object and action recognition. Affordance refers to the properties of an object, often its shape and material, that dictate how the object should be manipulated or interacted with. The possible set of actions that an object can afford is constrained. For instance, a person can drink from a plastic bottle, pour water into it, squeeze it, or spin it. But the plastic bottle cannot be easily torn into two pieces. Similar for a given action, the possible objects which it can apply to are also limited. For example, we can fold a paper but not a bottle. By using the information that constrains the objects and actions, the object recognition process can be optimized by considering a reduced set of data.

Turning now to an overview of the aspects of the invention, one or more embodiments of the invention address the above-described shortcomings of the prior art by providing a dual-attentional framework that weights the important features for objects and actions, respectively. The framework described herein leverages a first prediction module, an attention module, and a second prediction module that are integrated into a single network for end-to-end learning. The embodiments of the invention described herein only find when an action is happening and which object is being manipulated, but also identifies the part of the object with which the models is interacting. The dual attention framework receives object and action priors from a pre-attention prediction module to generate the attention maps. The attention maps are used to enhance the features that are used in the post-attention prediction to optimize the focus of attention for the object/action recognition.

Generally, the present technology for object detection in images relies upon identifying those features of those objects for which such technology has been programmed. Stated another way, an existing image processing engine will recognize, in a given image, certain objects which its parameters were tuned to recognize during the training phase. The above-described aspects of the invention address the shortcomings of the prior art by implementing the dual attention network.

The techniques described herein provide for generating a heatmap that focuses the attention in the image or video by indicating where the action is taking place or where the object is being manipulated in each frame. The attention maps can be used to enhance the video representation and improve both action and object recognition of the received data. Existing human object interaction models are very complex and grows quickly as the number of objects and actions increase.

Turning now to a more detailed description of aspects of the present invention, FIG. 1 depicts a processing system 100 for implementing embodiments of the invention. In accordance with embodiments of the invention, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
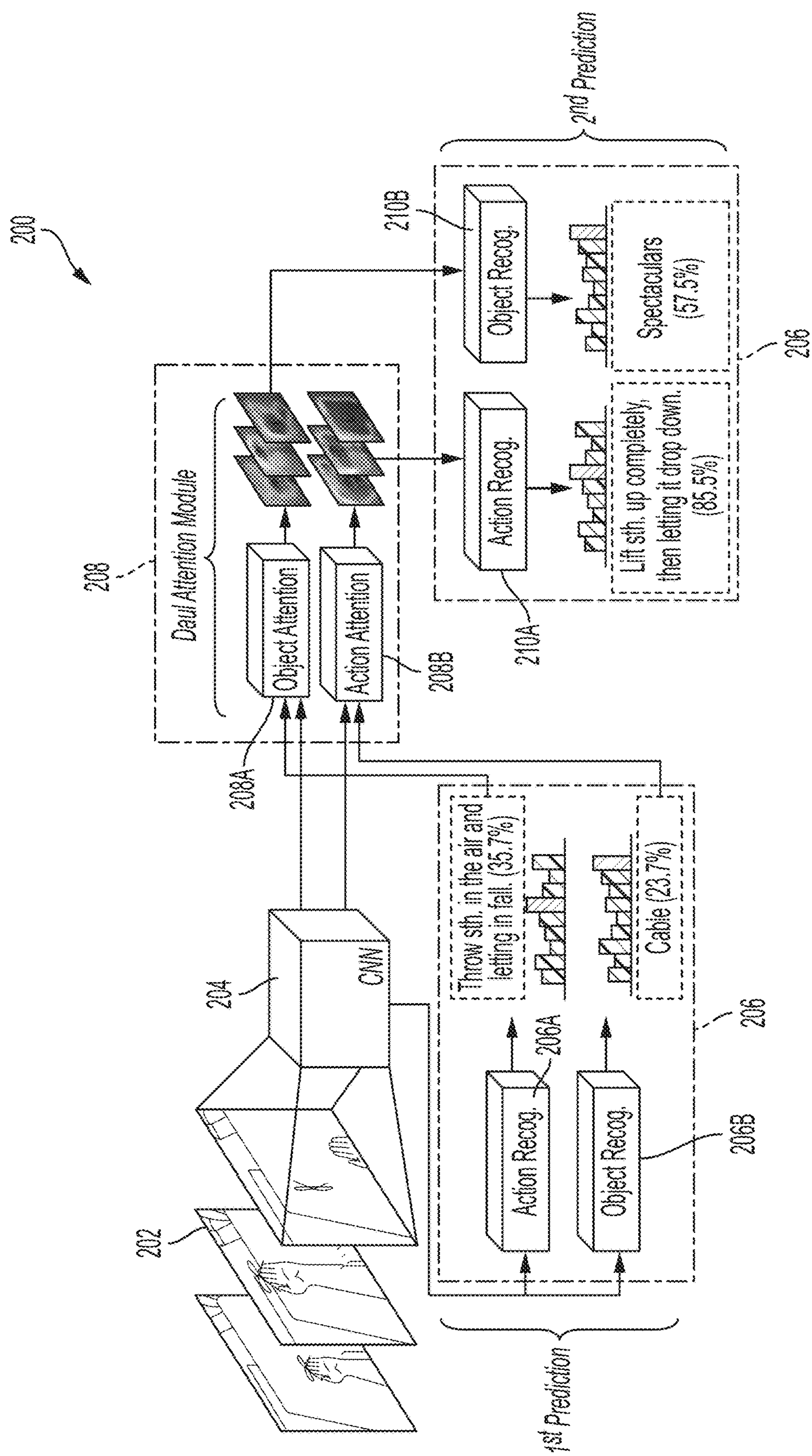
FIG. 2 depicts a framework for the dual attention network in accordance with one or more embodiments of the invention.

FIG. 2 depicts a framework 200 for performing context-aware action recognition by dual attention networks according to embodiments of the invention. The framework 200 includes a convolutional neural network 204, a pre-attention prediction module 206, a dual attention module 208, and a post-attention prediction module 210. FIG. 2 depicts the video data 202 is processed by a convolutional neural network 204. It should be understood the framework 200 is not limited to a specific CNN architecture and can be applied to various CNN architectures. In this non-limiting example, the video data 202 displays an individual's hand that throws a cable up in the air and the cable falling back down.

FIG. 2 depicts a pre-attention prediction module 206. The pre-attention prediction module 206 is configured to generate action priors and object priors. The pre-attention prediction module 206 includes an action recognition block 206A and an object recognition block 206B. The action recognition block 206A generates a plausible action label for the action. In this non-limiting example, the action recognition block 206A identifies with a 35.7% plausibility that an object is "thrown in the air and falls back down." The output of the action recognition block 206A is provided to the dual attention module 208.

The object recognition block 206B generates a plausible object labels for the object. In this non-limiting example, the object recognition block 206B identifies with a 23.7% plausibility that the object is a cable. The output of the object recognition block 206B is provided to the dual attention module 208.

Still referring to FIG. 2, the dual attention module 208 is configured to receive priors (predictions) from the pre-attention prediction module 206. The dual attention module 208 includes an object attention block 208A and an action attention block 208B. The dual attention module 208 uses action priors to attend image features for objects and object priors for actions. The priors from the pre-attention prediction module 206 provide useful information for objects and actions recognition, respectively.

Specifically, the action priors from the action recognition block 206A are provided to the object attention block 208A of the dual attention module 208, and the object priors from the objection recognition block 206B are provided to the action attention block 208B of the dual attention module 208.

The dual attention module 208 also receives the visual features at each frame from the CNN 204. The dual attention module 208 also generates the object and action attention distributions over N regions of the frame. The action priors and object priors are combined with the image features of the video data for each frame at the dual attention module 208. The dual attention module 208 is configured to generate attention maps that are used to identify the spatial location in each frame where the action and object is. The attention maps generate the heat maps by generating distributions over the spatial grids of feature maps for each frame. The weights are learned over the spatial features in the respective frames as described below with reference to FIG. 3.

The enhanced-attention features that are generated at the dual attention module 208 are output and provided to the post-attention prediction module 210 to perform a second prediction with a focused attention on the areas of interest of the frame for object and action recognition. The attention maps that are generated can be provided to a user to provide intuitive data of the focus of attention during processing.

The embodiments of the invention described herein provide guidance as to where actions are likely to be performed in a video stream. The focus of attention is represented by a heatmap indicating the likelihood of where an action is taking place or where an object is being manipulated in each frame. These attention maps can enhance video representation and improve both action and object recognition. The attention maps are intuitive and interpretable, enabling better video understanding and model diagnosis. Such attention maps facilitate spatiotemporal localization of objects and actions.

FIG. 2 also depicts a post-attention prediction module 210 that is configured to perform a post-attention prediction using the enhanced features from the dual attention module 208. The post-attention prediction module 210 is used to obtain representations of a video for the identified object and action. In one or more embodiments of the invention, the two-step scheme efficiently expresses the interaction between human and objects.

The output of the post-attention prediction module 210 can be used for enhanced object and action recognition. The output can be used to trace an object on a display to be presented to the user using the techniques described herein.

Figure 3:
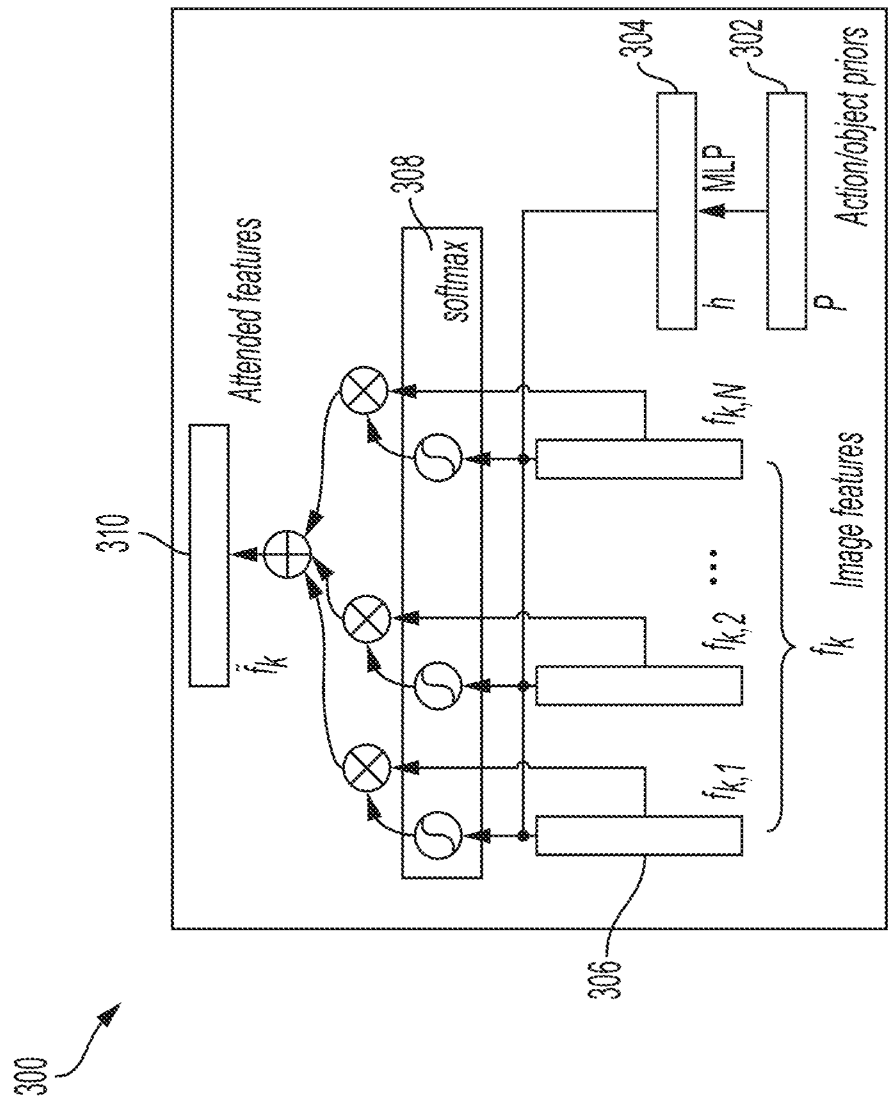
FIG. 3 depicts an attention model in accordance with one or more embodiments of the invention.

FIG. 3 depicts a representation of the dual attention model 300 in accordance with one or more embodiments of the invention. The model 300 is a more detailed implementations of the dual attention model 208 (shown in FIG. 2). The model 300 receives a plurality of inputs. The inputs include the action priors and object priors obtained from the pre-attention module. The action priors and object priors are fed to the multi-level perceptrons (MLP). The MLPs are used to fuse features of different frames of the video data. The framework not only finds when an action is happening and which object is being manipulated but also identifies which portion of the object is being interacted with.

Given a video V with T frames, CNN features from each frame are extracted independently, resulting in a set of T raw features $\{f_1, f_2, \ldots, f_T\}$, where $f_k \in \mathbb{R}^{d \times N}$, d is the feature dimension and N=HW is the vectorized spatial dimension of the feature map. The CNN features are then averaged by global pooling over the spatial dimension, i.e., $$\bar{f} = \frac{1}{N} \sum_{i=1}^{N} f_k[., i]$$

In a non-limiting example, all frames can be modeled by a long short-term memory network (LSTM), resulting in the final representation $\tilde{f}$ of a video $\hat{v}$ as:

$$\hat{v} = \mathrm{LSTM}(\bar{f}_{k1}, \bar{f}_{k2}, \ldots \bar{f}_{kT})$$

In a different non-limiting example, temporal relation network (TRN) can be implemented to explicitly learn and model temporal dependencies across sparsely sampled frames at different temporal scales. TRN can be applied on top of any 2D CNN architecture. More specifically, an n-order relation, for a given number n, is modeled as:

$$R_n(V) = h_\phi(\Sigma_{k_1<k_2< \ldots k_n} g_\theta(\tilde{f}_{k1}, \tilde{f}_{k2}, \ldots \tilde{f}k_n))$$

$h_\phi$ and $g_\theta$ are both multi-layer perceptrons (MLPs) fusing features of different frames. A small number of tuples uniformly sampled are selected. The mode can be extended to capture relations at multiple temporal scales by considering different values of n. The final representation of a video is an aggregation of a 2-order TRN up to an n-order TRN such as follows:

$$\hat{v} = R_2(V) + R_3(V) + \ldots + R_n(V)$$

where n is a hyperparameter of the model.

Video-based model operates on multiple frames within a video. As a result, given a video with T frames, features of each frame are not independent and cross-time dynamics may be learned in this way. Besides, temporal down-sampling is often adopted to form a sufficiently large receptive field over the temporal domain, so that the number of remaining frames T' is less or equal than T. Denote a set of T' features as $\{f_1, f_2, \ldots, f_{T'}\}$, where $f_k$ can be a super framed if T'<T, and like in image-based models each frame is then averaged by spatial global pooling. Since dynamics are expected to be learned implicitly within CNNs, the final representation of video is usually acquired by averaging across all (super) frames:

$$\hat{v} = \frac{1}{T'}\sum_{k=1}^{T'} \bar{f}_k$$

Given a video of a human-object-interaction, that action and the object are recognized by their associated interaction. For example, for a "playing" action, the model may recognize that it is "playing a violin" rather than "playing a piano." During training, the labels are provided at the video level without bounding-boxes. A straight-forward method for joint action-objection recognition is to add a separate classification head for object recognition alongside the head for action recognition. Tasks are different from standard object recognition in static images, because the model searches for objects being manipulated by the actor instead of those in the background. As a result, the object head should also utilize feature representations containing temporal information, i.e., for image-based models such as TRN, another multi-scale TRN module is used for object recognition, whereas for vide-based models an additional MPL is simply applied.

The proposed dual attention module for action and object recognition, is illustrated in FIG. 3. The model is not dependent on a specific CNN architecture thus it is can be implemented within various models. The dual attention module uses action priors to attend image features for objects, and object priors for actions. In a non-limiting example, the probabilities $p^a$ and $p^o$ over actions and objects (block 302) respectively of the likelihood to appear in the video. As shown in FIG. 3, two MLPs are applied to encode the probability vectors into two intermediate features representations (at block 304) $h^a, h^o \in \mathbb{R}^d$. The dual attention module takes input of the visual features (at blocks 306) at each frame and generates the object and action attention distributions over N regions of each frame:

$$z_k^a = w_a^T \tanh(W_a f_k + W_{ota} h^o \mathbb{1}^T)$$

$$z_k^o = w_o^T \tanh(W_o f_k + W_{ato} h^a \mathbb{1}^T)$$

$$\alpha_k = \text{softmax}(z_k^a)$$

$$\beta_k = \text{softmax}(z_k^o)$$

where $\mathbb{1} \in \mathbb{R}^N$ is a vector whose elements are all equal to 1. The softmax classifiers are shown at block 308, and the weights $W_a, W_o \in \mathbb{R}^{N \times d}$ and $w_a, w_o \in \mathbb{R}^N$ are the weights to be learned. $W_{ota}$, $W_{ato}$ c are parameters for object-to-action attention and action to object attention, respectively (at block 310). $\alpha_k, \beta_k \in \mathbb{R}^N$ are the attention weights over spatial features in $f_k$. The representation of each frame is obtained by weighted-average over its spatial domain:

$$\tilde{f}_k^a = \sum_{i=1}^{N} \alpha_{k,i} f_k[, i]$$

$$\tilde{f}_k^o = \sum_{i=1}^{N} \beta_{k,i} f_k[, i]$$

Finally, for x in {a, o}, representations of the video for action and object can be obtained, respectively, by substituting $\tilde{f}_k^x$, with $f_k^x$ in equations above.

Figure 4:
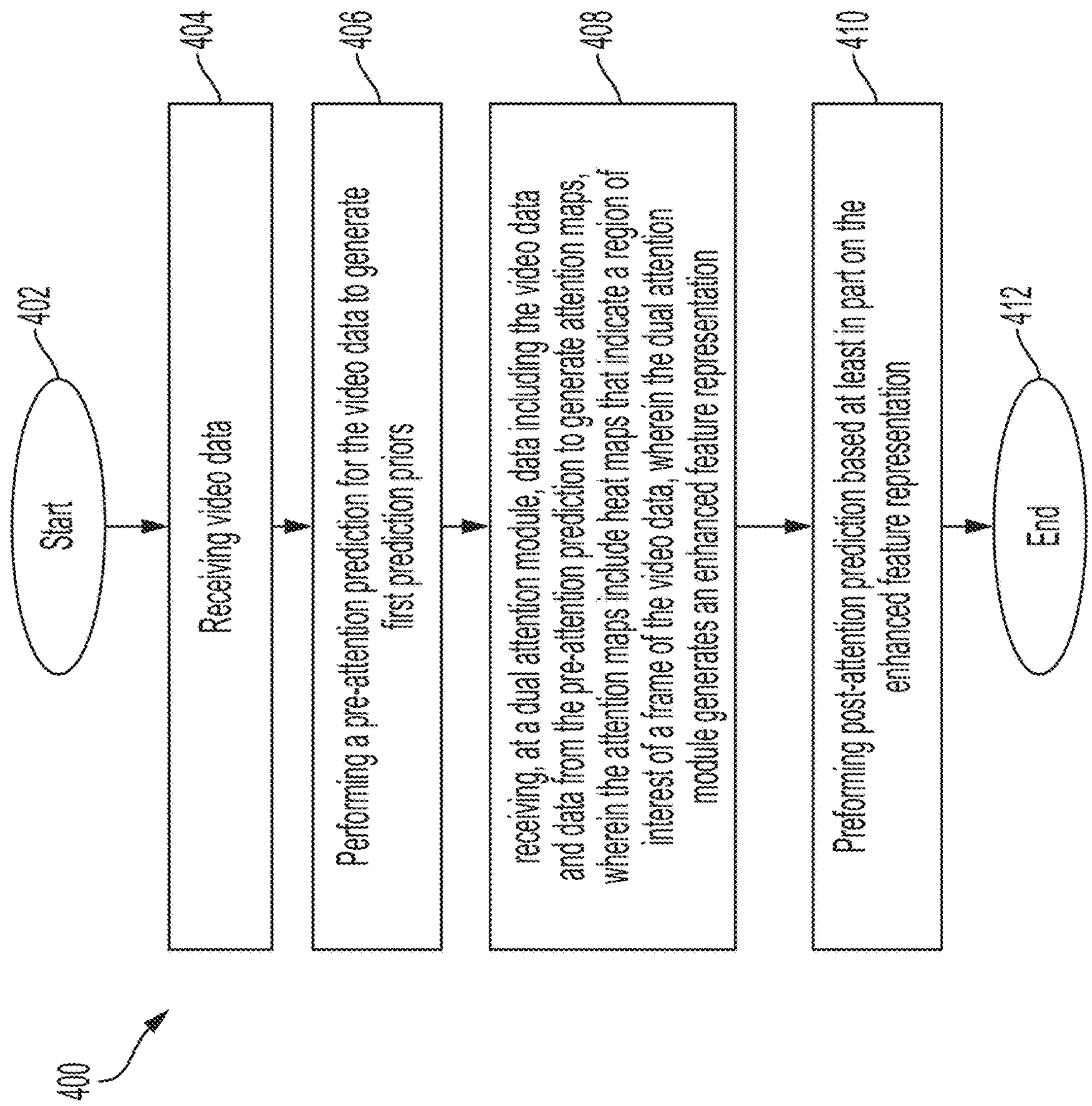
FIG. 4 depicts a flowchart of a method for performing context-aware action recognition using dual attention networks in accordance with one or more embodiments of the invention.

FIG. 4 depicts a flowchart of a computer-implemented method 400 for context-aware action recognition by dual attention networks. The computer-implemented method 400 can be implemented by the processing system 100 shown in FIG. 1. The method 400 begins at block 402 and proceeds to block 404 which provides for receiving video data. The video data is receiving by a processor or processing engine, including, for example, the processing system 100 shown in FIG. 1, and the video data is processed using a convention neural network. For example, the CNN 204 can be used to process the raw video data.

Block 406 performs a pre-attention prediction for the video data to generate first prediction priors. The pre-attention prediction module 206 is configured to adjust the weights to determine the probability of an object and its corresponding action occurring in the video.

Block 408 receives, at a dual attention module 208, data including the video data and data from the pre-attention prediction to generate attention maps, wherein the attention maps include heat maps that indicate a region of interest of a frame of the video data, wherein the dual attention module generates enhanced feature representations of the video data. As described with reference to FIG. 2, the object attention block 208A of the dual attention module 208 uses the action priors from the pre-attention prediction module 206 and the action attention block 208B of the dual attention module 208 to generate the attention maps. In one or more embodiments of the invention, the attention maps are heat maps that indicate where the object and/or the action occurs within one or more frames of the video. The attention maps or heat maps can be provided on the display to indicate to a user a region of interest during the processing of the video data for the object/action recognition.

Block 410 performs a post-attention prediction from the data from the dual attention module based at least in part on the enhanced feature representation. The post-attention prediction module is configured to perform an optimized prediction using the feature enhanced feature data generated by the dual attention module 208. The enhanced feature data can be used to perform accurate tracing of an object that in the video data and the information can be displayed to a user. The method 400 ends at block 412. It should be understood that various steps can be used in the method 400 and is not intended to be limited to the steps shown in FIG. 4.

By implementing the dual attention mechanism better understanding of where an action is occurring in the frame or the position of the frame. For example, the roles of different parts of an object can be learned by analyzing how the object is being used, i.e., by watching examples of "pouring water into a bottle." However, the detailed information can also provide which part of the bottle the water can be poured. As such, using the model described herein, the model focuses on the brim of a cup for videos involving pouring something into a cup or putting something into a cup. This enables the model to effectively parse object parts and infer their affordance even when the labels used for training are at the video-level.

Embodiments of the invention described herein provide techniques that improve the object/action recognition of existing algorithms by not introducing computational overhead as enhanced feature extraction because the pre-attention prediction and the post-attention prediction. In addition, the techniques described herein in accordance with embodiments of the invention exploit the action/objection relations to simultaneously learn cross-task objection/action attention maps, which significantly differs from previous methods that use self-guided attention. The techniques described herein in accordance with embodiments of the invention not only outperform the previous state-of-the-art on a human objection interaction dataset but also yield interpretable attention maps. In addition, the technical effects and benefits provided in accordance with embodiments of the invention include enabling the dual attention mechanism to facilitate the tracing of the object manipulated by the actor provided in the video data.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing recognition, the computer-implemented method comprising:

receiving video data;

performing, at a pre-attention prediction module, a pre-attention prediction for the video data to generate first prediction priors;

receiving, at a dual attention module, data including the video data and data from the pre-attention prediction to generate attention maps, wherein the attention maps indicate a region of interest of a frame of the video data and the attention maps further comprise heat maps which indicate a likelihood of where an action for an object is taking place or where the object is being manipulated in each frame, wherein the dual attention module generates enhanced feature representations; and performing, at a post-attention prediction module, a post-attention prediction from data from the dual attention module based at least in part on the enhanced feature representation.

2. The computer-implemented method of claim 1, wherein analyzing the video data comprises performing an action recognition process and an object recognition process.

3. The computer-implemented method of claim 1, wherein the dual attention module is configured to perform an object attention recognition process and an action attention recognition process based at least in part on the pre-attention prediction.

4. The computer-implemented method of claim 1, wherein the post-attention prediction comprises performing a second object attention recognition process and a second action attention recognition process.

5. The computer-implemented method of claim 1 further comprising tracing, on a display, an object based at least in part on the post-attention prediction.

6. A system for performing recognition, the system comprising:

a neural network configured to receive video data;

a pre-attention prediction module configured to generate a pre-attention prediction from the video data;

a dual attention module configured to generate an attention map using the first prediction, wherein the attention maps indicates a region of interest of a frame of the video data and the attention maps further comprise heat maps which indicate a likelihood of where an action for an object is taking place or where the object is being manipulated in each frame, wherein the dual attention module generates enhanced feature representations; and a second prediction module configured to generate a post-attention prediction based at least in part on the attention map and the enhanced feature representations.

7. The system of claim 6, further comprising a processor configured to analyze the video data comprises performing an action recognition process and an object recognition process.

8. The system of claim 6, wherein the dual attention module is configured to perform an object attention recognition process and an action attention recognition process based at least in part on the pre-attention prediction.

9. The system of claim 6, wherein the post-attention prediction comprises performing a second object attention recognition process and a second action attention recognition process based at least in part from the dual attention module.

10. The system of claim 9, further comprises tracing, on the display, an object based at least in part on the post-attention prediction.

11. A computer program product comprising a non-transitory computer-readable media having instructions stored thereon that when executed on a processor, cause the processor to:

receive video data;

perform a pre-attention prediction for the video data to generate first prediction priors;

receive data including the video data and data from the pre-attention prediction to generate attention maps, wherein the attention maps include heat maps that indicate a region of interest of a frame of the video data and the attention maps further comprise heat maps which indicate a likelihood of where an action for an object is taking place or where the object is being manipulated in each frame, wherein the dual attention module generates an enhanced feature representation; and performing a post-attention prediction from data from the dual attention module based at least in part on the enhanced feature representation.

12. The computer program product of claim 11, wherein analyzing the video data comprises performing an action recognition process and an object recognition process.

13. The computer program product of claim 11, wherein the instructions are further executable by a processor to cause the processor to perform an object attention recognition process and an action attention recognition process based at least in part on the pre-attention prediction.

14. The computer program product of claim 11, wherein the instructions are further executable by a processor to cause the processor to perform a post-attention prediction includes an object recognition process and an action recognition process.

15. The computer program product of claim 11, wherein the instructions are further executable by a processor to cause the processor to trace, on a display, an object based at least in part on the post-attention prediction.

* * * * *